United States Patent
Sadasue (10) Patent No.: US 9,846,966 B2
(45) Date of Patent: Dec. 19, 2017

(54) IMAGE PROCESSING DEVICE, IMAGE PROCESSING METHOD, AND COMPUTER PROGRAM PRODUCT

(71) Applicant: Tamon Sadasue, Kanagawa (JP)

(72) Inventor: Tamon Sadasue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/611,450

(22) Filed: Feb. 2, 2015

(65) Prior Publication Data

US 2015/0228122 A1    Aug. 13, 2015

(30) Foreign Application Priority Data

Feb. 12, 2014    (JP) .................................. 2014-024936

(51) Int. Cl.
*G06T 19/00* (2011.01)
*G06T 13/80* (2011.01)
(Continued)

(52) U.S. Cl.
CPC .............. *G06T 19/006* (2013.01); *G06F 3/00* (2013.01); *G06F 3/002* (2013.01); *G06F 3/011* (2013.01);
(Continued)

(58) Field of Classification Search
CPC .................. G06T 19/006; G06T 7/0042; G06T 2207/30204; G06T 7/0044; G06T 11/00;
(Continued)

(56) References Cited

U.S. PATENT DOCUMENTS 8,243,099 B2    8/2012    Ryu et al.
2009/0119583 A1    5/2009    Kihara et al.
(Continued)

FOREIGN PATENT DOCUMENTS

JP    4977725    4/2012
JP    2012-212343    11/2012
JP    2015-56771 A    3/2015

OTHER PUBLICATIONS

"Augmented Reality Multiple markers interactive cube" Retrieved from the Internet [https://www.youtube.com/watch?v=2_0emwlDk0Q], XP054975935, Dec. 7, 2010, 1 Page.
(Continued)

*Primary Examiner* — Jeffrey Chow
(74) *Attorney, Agent, or Firm* — Oblon, McClelland, Maier & Neustadt, L.L.P.

(57) ABSTRACT

An image processing device includes: an augmented-reality marker detecting unit that detects, from a captured image, an augmented reality marker indicating that a virtual object is to be displayed; an operation-marker detecting unit that detects, from the captured image, an area of an operation marker that is provided so as to correspond to the augmented reality marker; an operation detecting unit that detects, from the area of the operation marker, a user's operation on the operation marker; a virtual-object control unit that deforms a virtual object corresponding to the augmented reality marker in accordance with the user's operation; and a drawing unit that draws the deformed virtual object in the captured image in a superimposed manner.

11 Claims, 9 Drawing Sheets

(51) Int. Cl.
*G06F 3/147* (2006.01)
*G06F 3/00* (2006.01)
*G06K 9/00* (2006.01)
*G06F 3/01* (2006.01)
*G06F 3/03* (2006.01)

(52) U.S. Cl.
CPC ............ *G06F 3/0304* (2013.01); *G06F 3/147* (2013.01); *G06K 9/00671* (2013.01); *G06T 13/80* (2013.01); *G09G 2340/04* (2013.01); *G09G 2340/125* (2013.01)

(58) Field of Classification Search
CPC ........... G06T 2207/10016; G06T 19/00; G06T 17/00; G06T 19/20; G06T 19/003
See application file for complete search history.

(56) References Cited

U.S. PATENT DOCUMENTS

| | | | |
|---|---|---|---|
| 2009/0119585 A1 | 5/2009 | Sakuyama et al. | |
| 2011/0064309 A1 | 3/2011 | Sadasue et al. | |
| 2011/0170122 A1 | 7/2011 | Kihara et al. | |
| 2012/0218298 A1* | 8/2012 | Hayakawa | A63F 13/10 345/633 |
| 2013/0038633 A1* | 2/2013 | Maggiore | B01D 65/104 345/633 |
| 2013/0050194 A1* | 2/2013 | Makino | G06T 19/006 345/419 |
| 2013/0247049 A1 | 9/2013 | Aoki et al. | |
| 2013/0249944 A1* | 9/2013 | Raghoebardayal | G06T 19/006 345/633 |
| 2013/0278635 A1* | 10/2013 | Maggiore | G06T 19/006 345/633 |
| 2014/0009494 A1 | 1/2014 | Kasahara | |
| 2014/0075176 A1 | 3/2014 | Sadasue et al. | |
| 2014/0225914 A1* | 8/2014 | Kasahara | G06Q 30/02 345/629 |
| 2015/0070714 A1 | 3/2015 | Sadasue et al. | |
| 2015/0339858 A1* | 11/2015 | Nakamura | G06T 19/006 345/633 |

OTHER PUBLICATIONS

Steven J. Henderson, et al., "Evaluating the Benefits of Augmented Reality for Task Localization in Maintenance of an Armored Personnel Carrier Turret" 10th International Symposium on Mixed and Augmented Reality (ISMAR 2009), Retrieved from the Internet [https://www.youtube.com/watch?v=mn-zvymISvk], XP054975919, 2009, 1 Page.

Extended European Search Report dated Jun. 30, 2015 in Patent Application No. 15154658.7.

Matteo Magnani, "Flash Augmented Reality Demo With Multiple Markers" Retrieved from the Internet [https://www.youtube.com/watch?v=HfaGih85ZJg], XP054975934, May 20, 2010, 1 Page.

"Augmented Reality Multiple markers interactive cube" Retrieved from the Internet [https://www.youtube.com/watch?v=2_0emw1Dk0Q], XP054975935, Dec. 7, 2010, 1 Page.

Steven J. Henderson, et al., "Evaluating the Benefits of Augmented Reality for Task Localization in Maintenance of an Armored Personnel Carrier Turret" 10th International Symposium on Mixed and Augmented Reality (ISMAR 2009), Retrieved from the Internet [https://www.youtube.com/watch?v=mn-zvymISvk], XP054975919, 2009, 1 Page.

\* cited by examiner

FIG.12

IMAGE PROCESSING DEVICE, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2014-024936 filed in Japan on Feb. 12, 2014.

BACKGROUND OF THE INVENTION

1. Field of the Invention

The present invention relates to an image processing device, an image processing method, and a computer program product.

2. Description of the Related Art

An augmented reality (AR) technology that adds a virtual object to the actual world so as to present information beyond reality is known. A method is known, as a popular method for implementing the AR technology, in which an AR marker that is printed on a sheet, or the like, is captured by a camera, the relative position and the relative orientation of the camera with respect to the AR marker is analyzed, and a virtual object is added to the captured image.

The AR technology that uses an AR marker can be easily implemented by using a device that has a low calculation power, such as a mobile terminal. Furthermore, the method for detecting the relative position and the relative orientation of the camera with respect to the AR marker is described in "'development of the augmented reality system building tool ARToolKit' the Institute of Electronics, Information and Communication Engineers, the technology society, pp 79 to 86, 2002-02", or the like.

The process of the AR technology that uses the AR marker is roughly divided into an input process and an output process to a display. During the input process, the area of an AR marker is extracted from the captured image that is acquired from the camera so that the position in the three-dimensional space is estimated, and the size of the AR marker and data of the virtual object that is identified by using the AR marker are acquired by using the ID that is obtained by analyzing the AR marker. During the output process to the display, the virtual object's data, which is acquired during the input process, is used to locate it in the three-dimensional space, and the data that is located in the three-dimensional space is drawn by a three-dimensional graphics processor, or the like, so that it is displayed on the display.

The above-described AR technology allows a user to have a simulated experience by making the thing that is difficult to physically create, such as a small vehicle or a dinosaur, look as if it exists in the place or by virtually locating a piece of furniture at a desired place in the home before buying it. Furthermore, the above-described AR technology allows a user to have various experiences by displaying different virtual objects depending on the time, user, or the like, without remaking the physical background.

A device that displays the result of drawing using the AR technology is, for example, a mobile phone. Furthermore, it may be, for example, a PC display, or a small terminal that is called a tablet and that includes a liquid crystal panel display. Furthermore, it may be, for example, a device that is called a head-mounted display and that includes a display that is secured to the head, or the like, and is in the vicinity of the eye. Here, the vicinity also includes the case where a mirror or a half mirror is installed in the path of light that enters the eye from the display. Contrary to a mobile phone, or the like, if a head-mounted display is used, a user does not need to hold the terminal by the hand; therefore, there is the advantage of free hands.

A printed AR marker is used for detecting the position where a virtual object is drawn. Therefore, if the sheet on which an AR marker is printed is moved or rotated, the drawing position on the display is changed in synchronization with the movement. Thus, the AR technology that uses the AR marker makes it possible to partially realize an interaction on a virtual object in accordance with a human operation. However, it is difficult to realize detailed interactions, such as flipping through the pages of a book that is displayed as a virtual object, or opening a box that is displayed as a virtual object. That is, conventional AR technologies that use AR markers make it possible to simply move a virtual object itself.

Therefore, if the AR technology allows a user to perform more detailed operations on the virtual object that is displayed on the display in a superimposed manner and to realize an interaction, it is possible to provide a user with more varieties of virtual experiences.

For example, according to the technique that is described in Japanese Patent Application Laid-open No. 2012-212343, if a virtual object is displayed in the captured image in a superimposed manner on the basis of a physical object that is captured by the camera, a still image is clipped so that the virtual object is continuously displayed. Then, the display of the virtual object is changed in accordance with a user's touch operation, key operation, or the like. However, according to this technique, a device, such as a touch panel, is necessary in addition to a camera to detect a user's operation.

Furthermore, the device that recognizes the movement, called a gesture, of a human hand, or the like, from the moving image that is captured by a camera so as to recognize a user's operation is conceivable as an implementation means. In this case, a device, such as a touch panel, is not necessary; however, it is difficult for a user to know what kind of operation the user can perform or what kind of gestures the system can recognize. Furthermore, the accuracy with which gestures are recognized is relatively low.

A relevant technique is also described in Japanese Patent No. 4977725.

In view of the foregoing, there is a need to provide an image processing device, an image processing method, and a computer program product that easily realize an interaction in accordance with a user's operation when the AR technology is implemented by using images that are captured by a camera.

SUMMARY OF THE INVENTION

It is an object of the present invention to at least partially solve the problems in the conventional technology.

An image processing device includes: an augmented-reality marker detecting unit that detects, from a captured image, an augmented reality marker indicating that a virtual object is to be displayed; an operation-marker detecting unit that detects, from the captured image, an area of an operation marker that is provided so as to correspond to the augmented reality marker; an operation detecting unit that detects, from the area of the operation marker, a user's operation on the operation marker; a virtual-object control unit that deforms a virtual object corresponding to the augmented reality marker in accordance with the user's operation; and a drawing unit that draws the deformed virtual object in the captured image in a superimposed manner.

An image processing method includes: detecting, from a captured image, an augmented reality marker indicating that a virtual object is to be displayed; detecting, from the captured image, an area of an operation marker that is provided so as to correspond to the augmented reality marker; detecting, from the area of the operation marker, a user's operation on the operation marker; deforming a virtual object corresponding to the augmented reality marker in accordance with the user's operation; and drawing the deformed virtual object in the captured image in a superimposed manner.

A computer program product includes a non-transitory computer-readable medium having computer readable program codes. The program codes when executed causing the computer to perform: detecting, from a captured image, an augmented reality marker indicating that a virtual object is to be displayed; detecting, from the captured image, an area of an operation marker that is provided so as to correspond to the augmented reality marker; detecting, from the area of the operation marker, a user's operation on the operation marker; deforming a virtual object corresponding to the augmented reality marker in accordance with the user's operation; and drawing the deformed virtual object in the captured image in a superimposed manner.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

With reference to the attached drawings, a detailed explanation is given below of a terminal device 10 as an embodiment of an image processing device according to the present invention.

Figure 1:
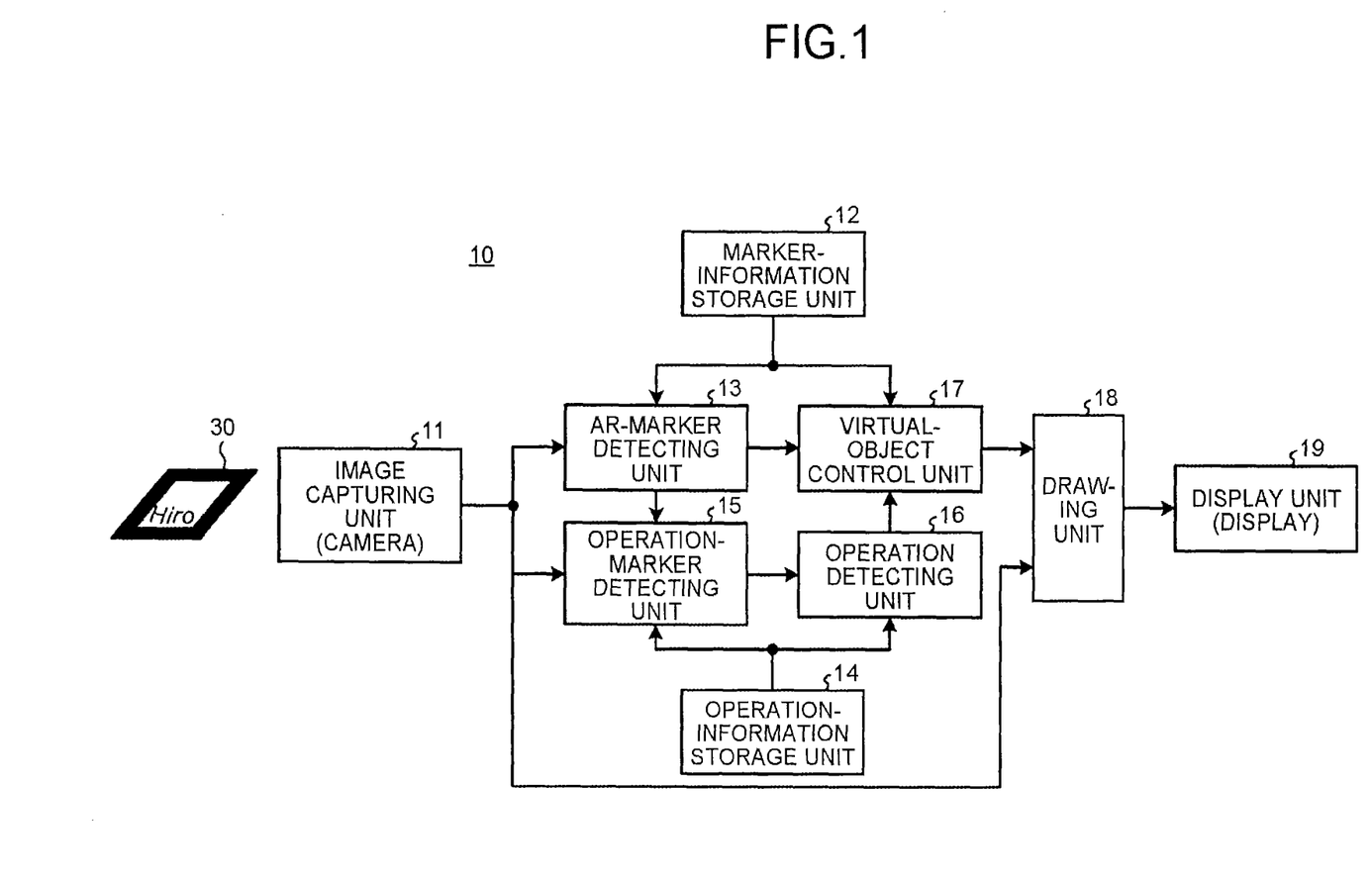
FIG. 1 is a configuration diagram of a terminal device according to an embodiment.

FIG. 1 is a configuration diagram of the terminal device 10 according to the embodiment. The terminal device 10 is a mobile device that has an image capturing function, an image processing function, and a display function, and it is, for example, a handheld mobile terminal, such as a mobile phone or a tablet terminal, or a head-mounted display.

The terminal device 10 captures the image of an object that includes a marker 30 by using a camera, analyzes the captured image to detect the relative position and the relative orientation of the camera with respect to the marker 30, and displays a virtual object that is located on the basis of the detected relative position and relative orientation such that it is superimposed on the captured image. Furthermore, when the terminal device 10 detects a user's operation from the captured image, it deforms the virtual object in accordance with the user's operation.

The marker 30 is two-dimensional information that is printed on an object, such as a sheet, and that is located in the actual space. The marker 30 is, for example, two-dimensional information that is described in monochrome. The marker 30 is not limited to monochrome but may be colored.

Figure 2:
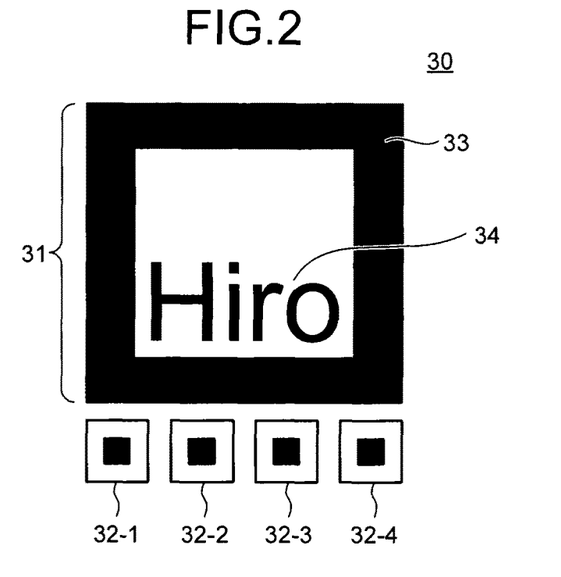
FIG. 2 is a diagram that illustrates a first example of a marker.

As illustrated in FIG. 2, the marker 30 includes an augmented reality marker (AR marker) 31 and at least one operation marker 32 (32-1, 32-2, 32-3, 32-4).

The AR marker 31 is the information for identifying a virtual object to be displayed and the position and orientation in a captured image where the virtual object is superimposed. The AR marker 31 includes an outer frame portion 33 and an ID description area 34. The outer frame portion 33 is the area for clipping an image portion of the AR marker 31 from the captured image. The outer frame portion 33 is a graphic that has a predetermined outer shape, and it includes a space for describing the ID description area 34 in the inside of the outer frame portion 33. In the present embodiment, it has a square frame shape of 10 cm by 10 cm. Such a shape of the AR marker 31 allows the terminal device 10 to determine the relative position and the relative orientation of the camera with respect to the AR marker 31. Furthermore, the AR marker 31 may have not only a square shape but also any shape as long as it is a predetermined shape.

Figure 3:
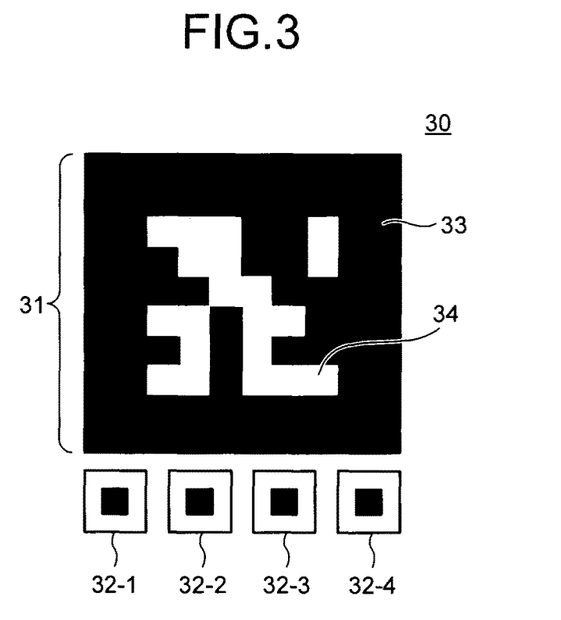
FIG. 3 is a diagram that illustrates a second example of the marker.

A graphic, character, or the like, which is a predetermined pattern, is described in the ID description area 34. Thus, the ID description area 34 allows the terminal device 10 to acquire the ID of the AR marker 31 by performing a pattern matching with an image pattern that is previously registered. Furthermore, as illustrated in FIG. 3, N (N is an integer greater than or equal to 2)×N grid-like array areas may be formed on the ID description area 34, each of the areas being a white or black area that corresponds to 0 or 1. In this case, with respect to the binary array (the data column made up of 0 and 1) that represents the ID, the array pattern where, for example, 0 is replaced by black and 1 by white is formed on the N×N grid areas of the ID description area 34. Thus, the ID description area 34 allows the terminal device 10 to detect the array pattern of white areas and black areas and acquire the ID of the AR marker 31.

Each of the operation markers 32 is the information for detecting a user's operation to give an instruction to deform a virtual object. Each of the operation markers 32 is provided so as to correspond to the AR marker 31. In the present embodiment, each of the operation markers 32 is located at a predetermined position relative to the AR marker 31. For instance, in the examples of FIG. 2 and FIG. 3, the four operation markers 32 (32-1, 32-2, 32-3, 32-4) are arranged side by side along a lower side of the square AR marker 31 at positions away from the lower side by a predetermined distance.

Furthermore, how to deform a virtual object is previously assigned to each of the operation markers 32. For instance, in the examples of FIG. 2 and FIG. 3, different movements are assigned to the four operation markers 32. Thus, when a user's operation is performed (for example, when touched with a user's finger, or the like), each of the operation markers 32 allows the terminal device 10 to deform a virtual object, which is displayed on the basis of the AR marker 31, in accordance with the assigned movement.

As illustrated in FIG. 1, the terminal device 10 includes an image capturing unit 11, a marker-information storage unit 12, an augmented-reality marker detecting unit (an AR-marker detecting unit) 13, an operation-information storage unit 14, an operation-marker detecting unit 15, an operation detecting unit 16, a virtual-object control unit 17, a drawing unit 18, and a display unit 19.

The image capturing unit 11 is a camera, and it captures an image of an object that includes the marker 30 in response to a user's operation. The marker-information storage unit 12 stores the information for identifying a virtual object to be displayed, the size of the AR marker 31, or the like, in relation to the ID of the AR marker 31.

The AR-marker detecting unit 13 detects the AR marker 31 from the image that is captured by the image capturing unit 11. More specifically, the AR-marker detecting unit 13 detects the area of the AR marker 31 from the captured image and acquires the ID of the AR marker 31. Furthermore, the AR-marker detecting unit 13 detects the relative position and the relative orientation of the camera, which is the image capturing unit 11, with respect to the AR marker 31.

The operation-information storage unit 14 stores the information on the operation marker 32 that is provided so as to correspond to the AR marker 31. More specifically, the operation-information storage unit 14 stores the positional relationship between the AR marker 31 and each of the operation markers 32, the image pattern (reference image) for each of the operation markers 32, the movement that is assigned to each of the operation markers 32, or the like.

The operation-marker detecting unit 15 detects the area of each of the operation markers 32 from the image captured by the image capturing unit 11. More specifically, the operation-marker detecting unit 15 detects the area of the operation marker 32 from the captured image on the basis of the position of the AR marker 31 in the captured image and the positional relationship between the AR marker 31 and the operation marker 32.

The operation detecting unit 16 detects a user's operation performed on the operation marker 32 from the area of the operation marker 32 that is detected by the operation-marker detecting unit 15. For example, the operation detecting unit 16 compares the partial image of the area of the operation marker 32 that is detected from the captured image with the image pattern (reference image) of the operation marker 32 that is stored in the operation-information storage unit 14, thereby determining whether a user's operation is performed on the operation marker 32. More specifically, the operation detecting unit 16 detects the difference between the partial image of the area of the operation marker 32 in the captured image and the previously stored reference image of the operation marker 32 and, if the difference is greater than a predetermined threshold, determines that a user's operation is performed on the corresponding operation marker 32. Furthermore, if the operation detecting unit 16 detects part of a human body from the area of the operation marker 32 in the captured image, it may determine that a user's operation is performed on the corresponding operation marker 32. Then, if the operation detecting unit 16 determines that a user's operation is performed on any of the operation markers 32, it gives, to the virtual-object control unit 17, the information on the movement that is assigned to the operation marker 32 on which the user's operation is performed.

The virtual-object control unit 17 uses the ID that is detected by the AR-marker detecting unit 13 to determine a virtual object that is to be drawn in the captured image in a superimposed manner. Furthermore, the virtual-object control unit 17 determines the relative position and the relative orientation of the camera with respect to the AR marker 31 that is detected by the AR-marker detecting unit 13. Moreover, the virtual-object control unit 17 uses the ID that is detected by the AR-marker detecting unit 13 to determine the size of the AR marker 31. Then, the virtual-object control unit 17 uses each piece of determined information to locate the three-dimensional model of the virtual object in the three-dimensional coordinates. Furthermore, if the information on the movement in accordance with a user's operation is given from the operation detecting unit 16, the virtual-object control unit 17 deforms the three-dimensional model of the virtual object, which is located in the three-dimensional coordinates, on the basis of the given information on the movement.

The drawing unit 18 projects the three-dimensional model of the virtual object, which is located in the three-dimensional coordinates by the virtual-object control unit 17, to the two-dimensional coordinate system (screen coordinate system) that corresponds to the captured image. Then, the drawing unit 18 draws the virtual object, which is projected to the screen coordinate system, in the image that is captured by the image capturing unit 11 in a superimposed manner. In this case, if the virtual object is deformed in accordance with a user's operation, the drawing unit 18 draws the deformed virtual object in the captured image in a superimposed manner.

The display unit 19 is a display, and it displays the captured image where a virtual object is drawn by the drawing unit 18 in a superimposed manner.

Figure 4:
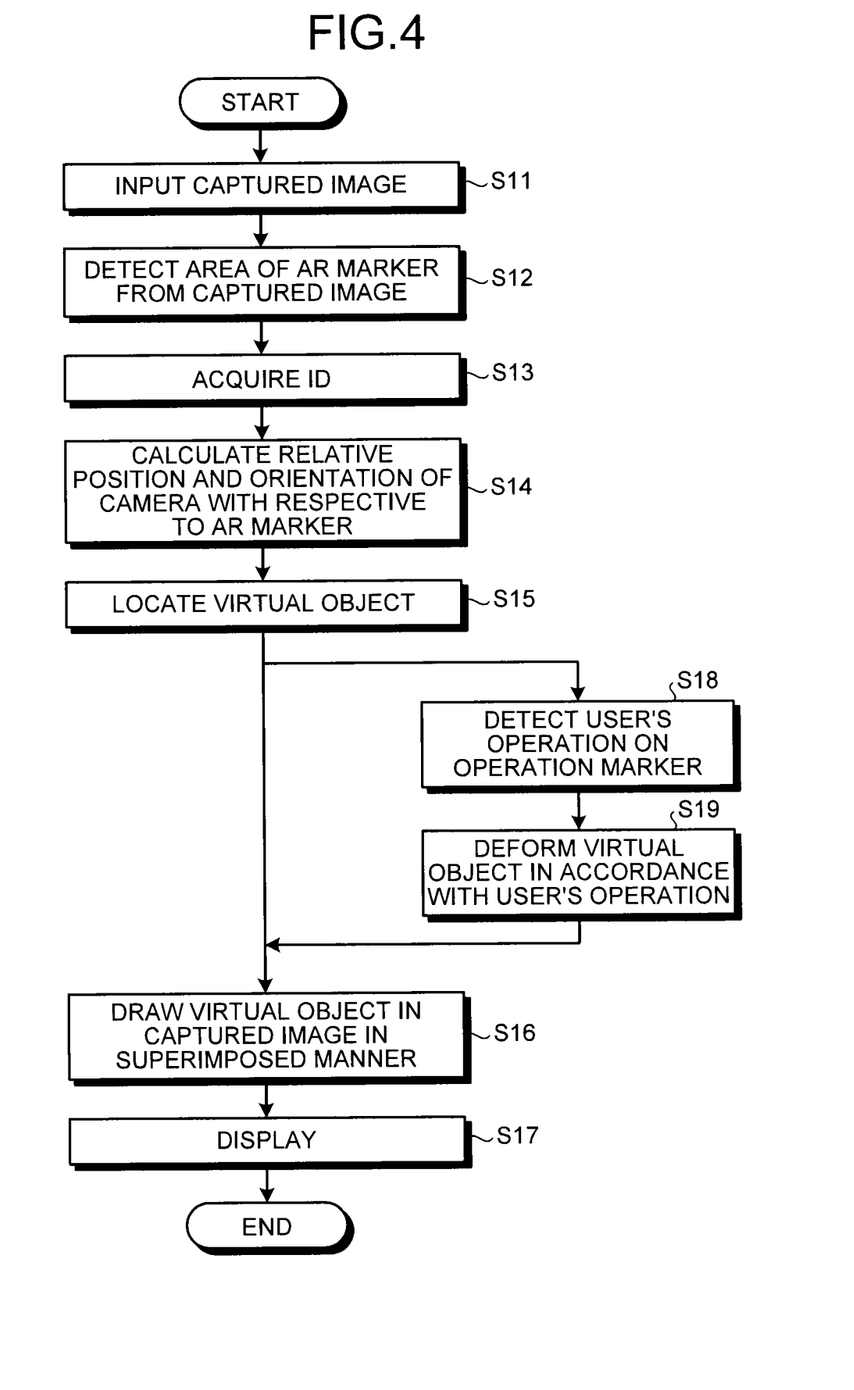
FIG. 4 is a diagram that illustrates the procedure of the terminal device according to embodiment.

FIG. 4 is a diagram that illustrates the procedure of the terminal device 10 according to the embodiment. If a user's operation is not performed on the operation marker 32, the terminal device 10 performs Step S11 to Step S17 of FIG. 4 to display the captured image where a virtual object is superimposed. Furthermore, if a user's operation is performed on the operation marker 32, the terminal device 10 performs operations at Step S18 and Step S19 in addition to Step S11 to Step S17 to display the captured image where the deformed virtual object is superimposed.

First, an explanation is given of the operation (from Step S11 to Step S17) in a case where a user's operation is not performed.

At Step S11, the image capturing unit 11 inputs a captured image. The image capturing unit 11 continuously captures an image on a frame to frame basis. The terminal device 10 performs the following operation from Step S12 to Step S17 each time the image capturing unit 11 inputs a captured image (on a frame to frame basis).

Next, at Step S12, the AR-marker detecting unit 13 detects the area of the AR marker 31 from the captured image. For example, if the AR marker 31 is generated by using a monochrome image and it is a square, the AR-marker detecting unit 13 detects the area of the AR marker 31 as described below.

First, the AR-marker detecting unit 13 binarizes the entire captured image so as to obtain a white color and a black color. Next, the AR-marker detecting unit 13 performs an operation called labeling on the binarized captured image so as to separate it to clusters of white pixels or black pixels. Next, the AR-marker detecting unit 13 detects four vertices from the outline of each of the obtained clusters of black pixels. For example, the AR-marker detecting unit 13 determines that the point where a straight line is bent is a vertex. The operation-information storage unit 14 removes, from the candidates for the area of the AR marker 31, the one that does not have four vertices and determines that the remaining candidate is the area of the AR marker 31.

Next, at Step S13, the AR-marker detecting unit 13 performs a pattern matching or a black-white pattern detection on the ID description area 34, thereby acquiring the ID.

Next, at Step S14, the AR-marker detecting unit 13 uses the area of the AR marker 31, e.g., the four vertices, to calculate the relative position and the relative orientation of the camera with respective to the AR marker 31, and the size. Specifically, the AR-marker detecting unit 13 calculates a coordinate conversion equation (an equation that represents a rotation, a parallel displacement, and an enlargement percentage) for projecting the three-dimensional model of the virtual object that is located in the three-dimensional marker coordinate system (global coordinate system) to the two-dimensional coordinate system (screen coordinate system) on the image that is captured by the camera.

Figure 5:
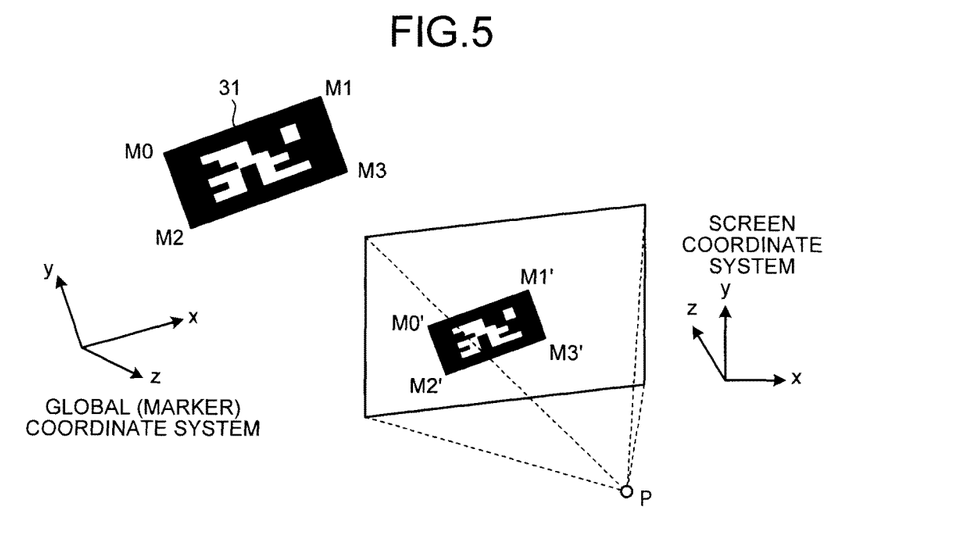
FIG. 5 is a diagram that illustrates a conversion process from a global (marker) coordinate system to a screen coordinate system.

For example, the AR-marker detecting unit 13 performs a calculation as described below. First, as illustrated in FIG. 5, if the center of the AR marker 31 is $(x, y, z)=(0, 0, 0)$ in the three-dimensional marker coordinate system, the vertices of the four corners are on the same plane; therefore, the coordinates of the four corners are represented as below. The marker coordinate system may be a three-dimensional coordinate system (global coordinate system) that represents the space where the AR marker 31 is located.

$M0=(-a,-a,0)$ $M1=(a,-a,0)$ $M2=(-a,a,0)$ $M3=(a,a,0)$

If the four coordinates are subjected to a three-dimensional coordinate conversion for a rotation and a parallel displacement, they are converted into the coordinates of a three-dimensional camera coordinate system. Then, perspective projection is performed from the three-dimensional camera coordinate system to the two-dimensional virtual screen that corresponds to the image surface of the captured image, whereby the four vertices ($M0'$, $M1'$, $M2'$, $M3'$) represented by using the two-dimensional coordinates are calculated. Here, the three-dimensional coordinate conversion equation for a rotation and a parallel displacement corresponds to the relative position and the relative orientation of the camera. Furthermore, the enlargement percentage between the three-dimensional marker coordinate system and the three-dimensional camera coordinate system is calculated based on the ratio of the size of a pixel of the captured image to the size of the ID that is acquired from the AR marker 31. Thus, the AR-marker detecting unit 13 is capable of calculating the coordinate conversion equation (the equation that represents a rotation, a parallel displacement, and an enlargement percentage) for projecting the three-dimensional model of the virtual object that is located in the marker coordinate system (global coordinate system) to the two-dimensional coordinate system (screen coordinate system) on the image that is captured by the camera.

Next, at Step S15, the virtual-object control unit 17 locates a virtual object in the three-dimensional space. More specifically, the virtual-object control unit 17 acquires the three-dimensional model of the virtual object that corresponds to the ID of the AR marker 31. For example, the virtual-object control unit 17 reads the information that is stored in the marker-information storage unit 12, the information that is previously registered in a program, or the information that is stored in a server so as to acquire the three-dimensional model. For example, the three-dimensional model is a set of data that can be handled by a 3D programming Application Programming Interface (API), and it includes a set of point coordinates that represent a triangular plane called a polygon, texture image data, an arrangement position, and the like. Furthermore, the virtual-object control unit 17 locates such a three-dimensional model in a predetermined position of the marker coordinate system (global coordinate system). This allows the virtual-object control unit 17 to locate a virtual object in the three-dimensional space.

Next, at Step S16, the drawing unit 18 draws the virtual object in the captured image in a superimposed manner. Specifically, the drawing unit 18 perspectively projects the virtual object, which is located in the three-dimensional space, to the two-dimensional virtual screen that corresponds to the image plane of the captured image by using the relative position and the relative orientation of the camera with respect to the AR marker 31 and the size (i.e., a coordinate conversion equation), which is calculated at Step S14, thereby rendering it as the background of the captured image. Rendering to the virtual screen according to perspective projection is performed by using, for example, a GPU or CPU that is dedicated to three-dimensional graphics and by using a 3D programming API.

Figure 6:
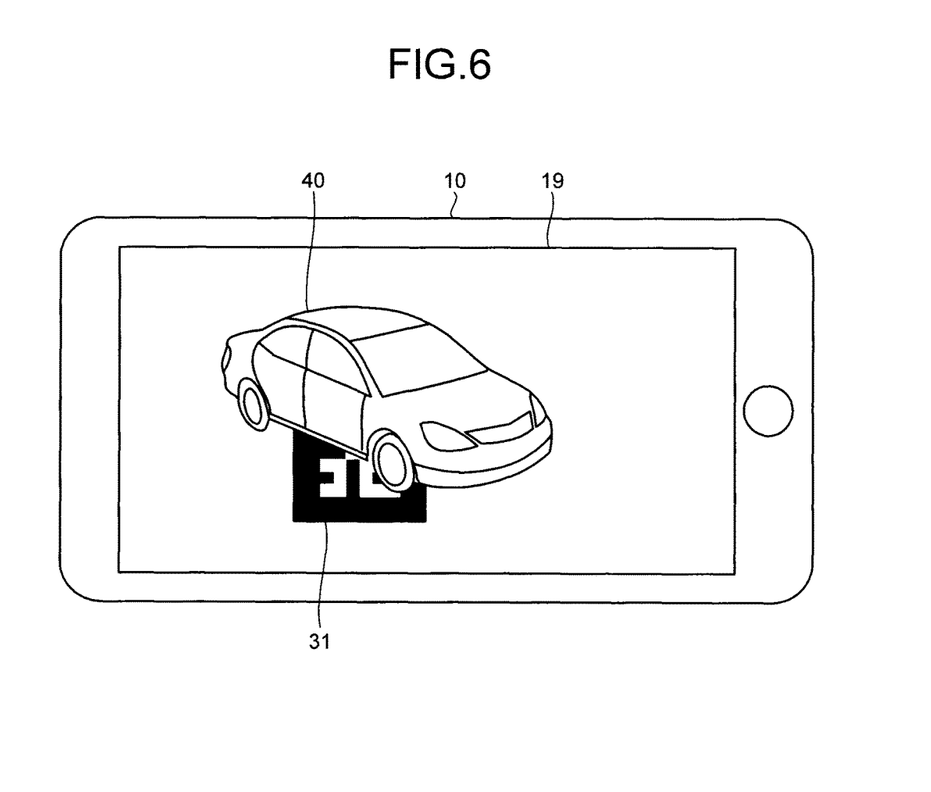
FIG. 6 is a diagram that illustrates the appearance of the terminal device that displays a virtual object.

Finally, at Step S17, as illustrated in FIG. 6, the display unit 19 displays the captured image where the virtual object 40 is drawn in a superimposed manner.

Next, an explanation is given of an operation (from Step S18 to Step S19) when a user's operation is performed.

Figure 7:
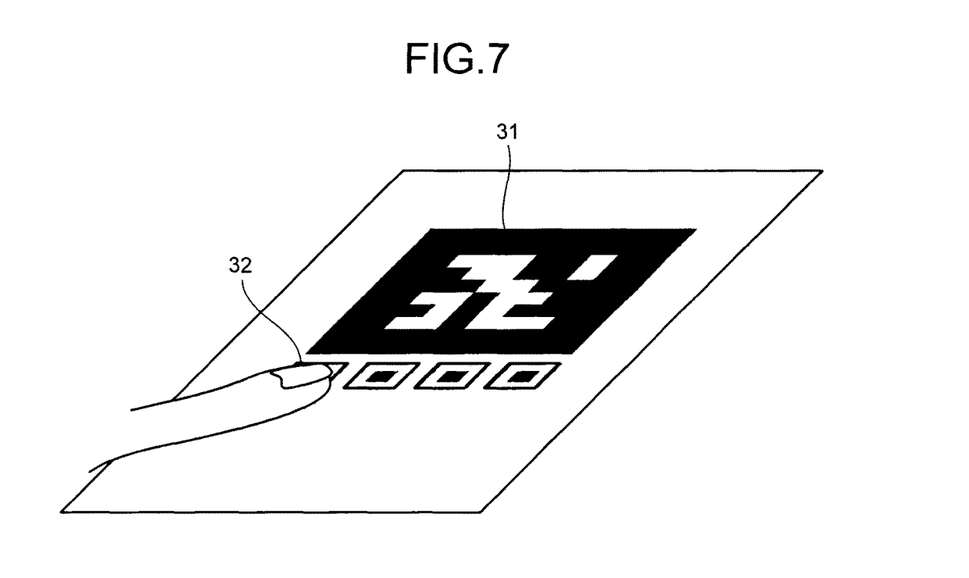
FIG. 7 is a diagram that illustrates an example of a user's operation on an operation marker.

At Step S18, the operation-marker detecting unit 15 detects a user's operation on the operation marker 32. In the present embodiment, as illustrated in FIG. 7, the operation-marker detecting unit 15 determines that a user's operation is performed on the operation marker 32 if the operation marker 32 is touched by a user's finger, or the like.

Specifically, the operation-marker detecting unit 15 performs the following operation to determine whether a user's operation is performed. First, due to the operation until Step S14, the area of the AR marker 31 is detected from the captured image, and the relative position and the relative orientation of the camera with respect to the AR marker 31 are calculated. Regarding the operation marker 32, the positional relationship with respect to the AR marker 31 is known. Therefore, the operation-marker detecting unit 15 uses the three-dimensional model of the operation marker 32 that is previously stored in the operation-information storage unit 14 and uses the coordinate conversion equation that is calculated at Step S14 to perform perspective projection to the virtual screen. Then, the partial image of the area of the operation marker 32 that is actually captured is compared with the image that is the result of projection as a reference image, and it is determined whether a user's operation is performed on the operation marker 32.

For example, the operation-marker detecting unit 15 uses the difference in the luminance value of a pixel to calculate the degree of dissimilarity and, if the degree of dissimilarity is lower than a threshold, determines that the operation marker 32 is detected (i.e., the operation marker 32 is not covered by a user). Conversely, if the degree of dissimilarity is equal to or greater than a threshold, the operation-marker detecting unit 15 determines that the operation marker 32 is not detected (i.e., the operation marker 32 is pressed or touched by a user).

Furthermore, the operation-marker detecting unit 15 uses a different method, i.e., makes use of the fact that the operation marker 32 is present in a predetermined relative position with respect to the AR marker 31, thereby determining the area where the operation marker 32 originally appears in the captured image. For example, the operation-marker detecting unit 15 stores, as a reference image, the partial image of the area where the operation marker 32 appears in the initially captured image. Then, the stored reference image may be compared with the partial image of the area of the operation marker 32 that is acquired from the subsequently captured image, to determine whether a user's operation is performed.

Furthermore, for example, the sum of squares of the difference in the luminance value of a pixel after conversion to a gray scale may be used for a calculation of the degree of dissimilarity. In this case, there is a possibility that the virtual screen is misaligned from the actual captured image to a certain degree. Therefore, the operation-marker detecting unit 15 may move the position of the image to be compared by several pixels and compare the smallest sum of squares with a threshold.

For example, the operation-marker detecting unit 15 determines that a user's operation is not performed if the following inequality is satisfied and, if it is not satisfied, determines that a user's operation is performed. In this regard, Th is a threshold. The operation-marker detecting unit 15 moves dx, dy within a certain range, thereby determining that the position of the image to be compared is moved by several pixels.

$$\min_{dx,dy}\left\{\sum \{I(x, y) - I'(x + dx, y + dy)\}^2\right\} < Th \quad (1)$$

Furthermore, the operation-marker detecting unit 15 may determine that a user's operation is performed on the corresponding operation marker 32 when it detects part of a human body in the area of the operation marker 32 in the captured image. For example, the operation-marker detecting unit 15 may detect whether the area in the image where the operation marker 32 is supposed to be present includes the skin color of a person.

Figure 8:
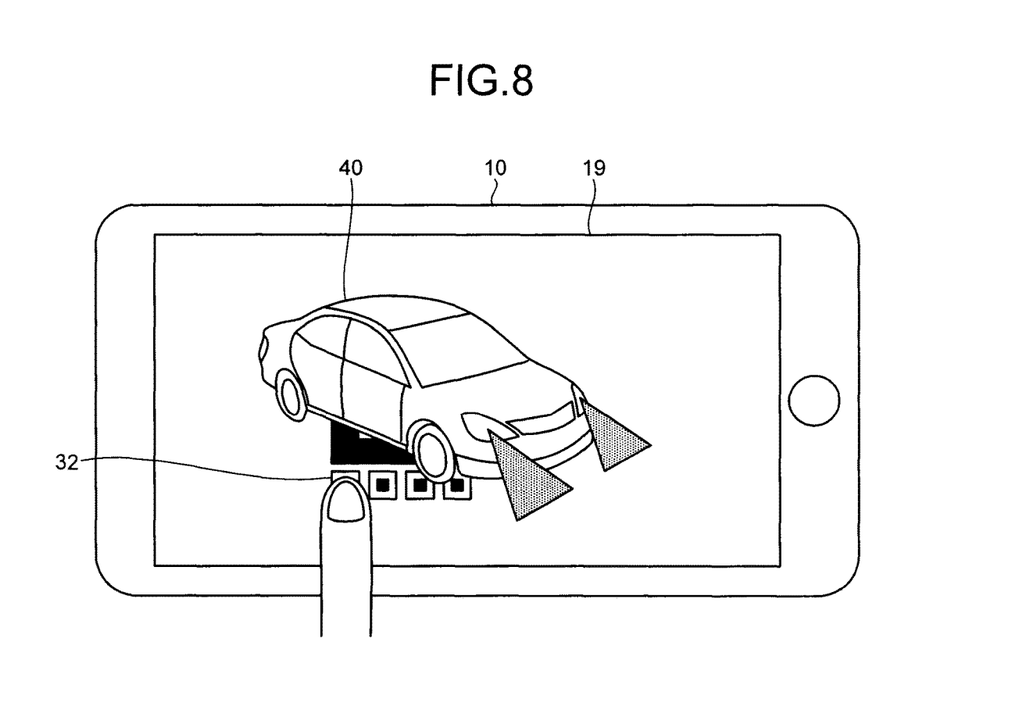
FIG. 8 is a diagram that illustrates the appearance of the terminal device that displays a virtual object that is deformed in accordance with a user's operation.

Next, at Step S19, the virtual-object control unit 17 deforms the virtual object in accordance with a user's operation. If a user's operation is performed on the operation marker 32, the virtual-object control unit 17 deforms the three-dimensional model of the virtual object that is located in the three-dimensional space by using the movement corresponding to the operation marker 32 on which the user's operation is performed. For example, as illustrated in FIG. 8, the virtual-object control unit 17 adds the three-dimensional model of light to the three-dimensional model of a vehicle in a state where the light is not turned on, thereby deforming the virtual object 40. The virtual-object control unit 17 acquires, from the marker-information storage unit 12, a program, a server, or the like, the three-dimensional model that is changed as described above. Furthermore, the virtual-object control unit 17 may change data of the three-dimensional model (e.g., point coordinates data of a polygon) of the virtual object that has been already located. This allows the virtual-object control unit 17 to deform the virtual object such that the lid of a box is opened. Furthermore, if the virtual-object control unit 17 can represent an animation by changing the three-dimensional model in a smooth manner within one second.

As described above, with the terminal device 10 according to the present embodiment, if the AR technology is implemented by using images that are captured by a camera, an interaction in accordance with a user's operation can be easily performed.

Next, an explanation is given of a modified example of the present embodiment. Furthermore, as the modified example has almost the same functionality and configuration as the terminal device 10 according to the present embodiment, the component that is almost the same is denoted by the same reference mark below, and its explanation is omitted except for the differences.

Figure 9:
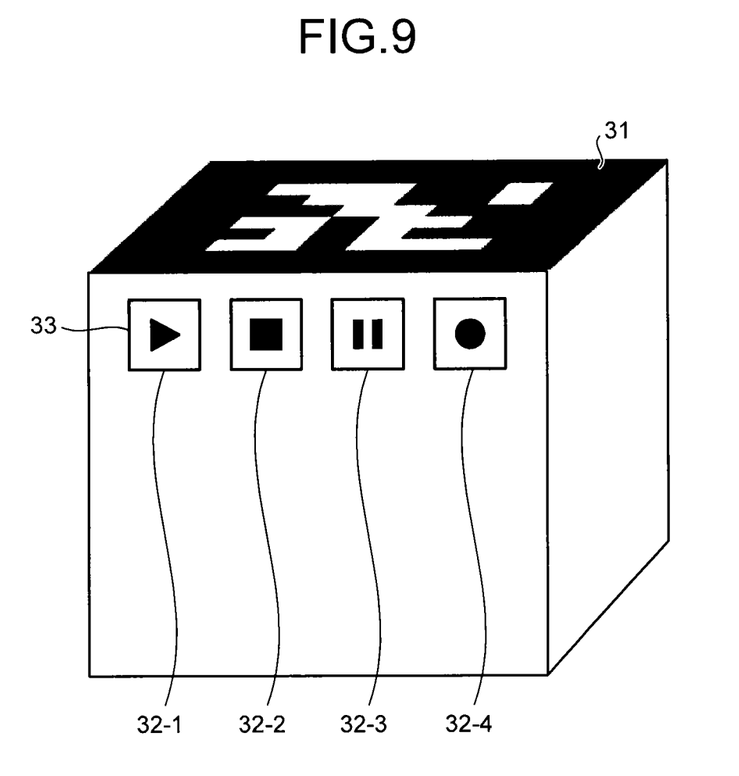
FIG. 9 is a diagram that illustrates an example of the operation marker according to a first modified example.

FIG. 9 is a diagram that illustrates an example of the operation marker 32 according to a first modified example. The operation marker 32 according to the first modified example can be detected independently from the corresponding AR marker 31. Specifically, the operation marker 32 according to the first modified example includes the outer frame portion 33 as is the case with the AR marker 31.

Figure 10:
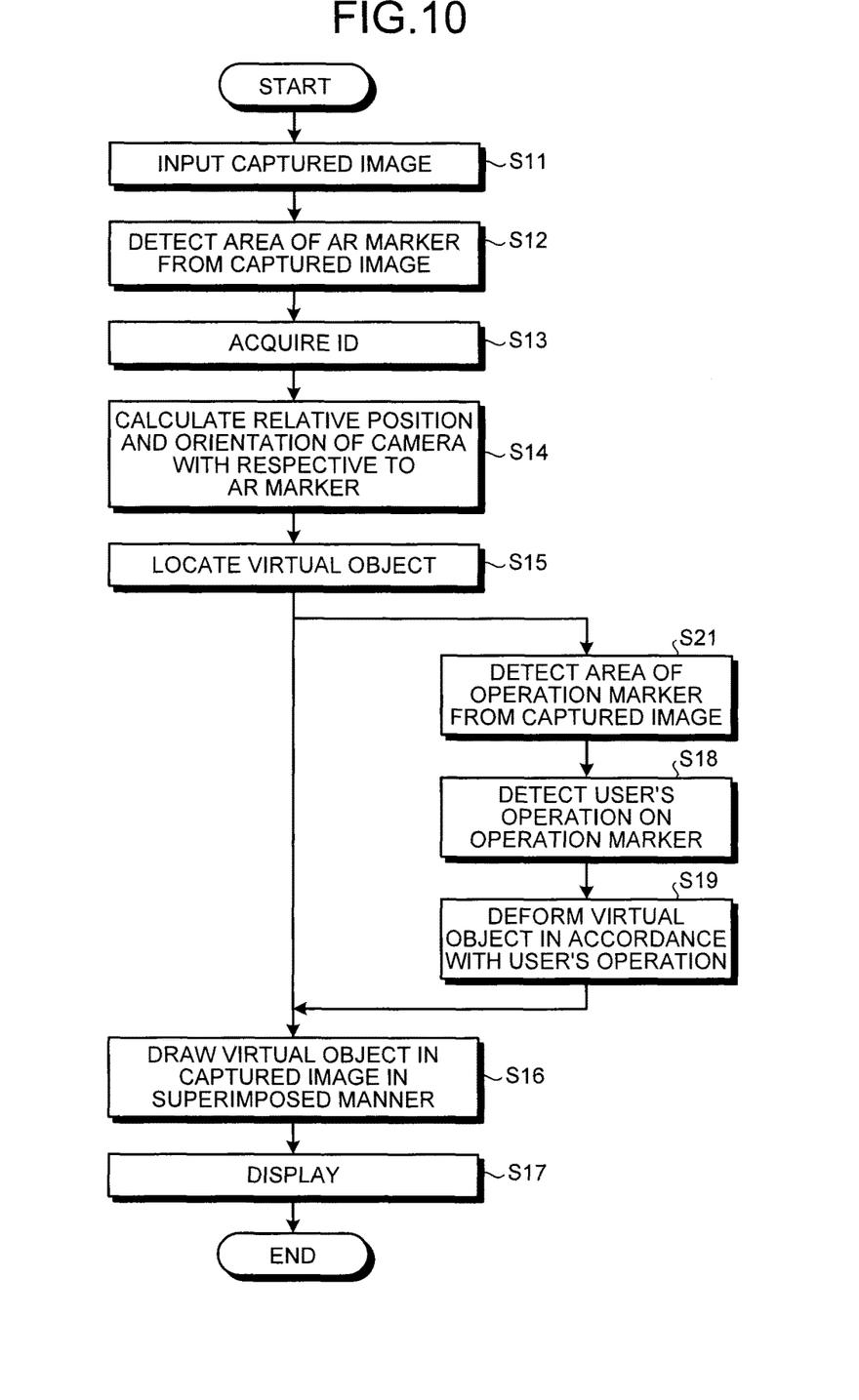
FIG. 10 is a chart that illustrates the procedure of the terminal device according to the first modified example.

FIG. 10 is a chart that illustrates the procedure of the terminal device 10 according to the first modified example. In the first modified example, if a user's operation is performed, the terminal device 10 performs Step S21 before the operation at Step S18.

At Step S21, the operation-marker detecting unit 15 detects the area of the operation marker 32 independently from the AR marker 31. For example, the operation-marker detecting unit 15 detects the area of the operation marker 32 in the same manner as in the operation to detect the AR marker 31. Furthermore, after the operation-marker detecting unit 15 once succeeds in detecting the operation marker 32, it stores the three-dimensional position of the operation marker 32 and, afterward, uses the information on the stored three-dimensional position to detect whether the operation marker 32 is touched by a user. In this case, the operation-marker detecting unit 15 may store the three-dimensional position of the operation marker 32 as the relative position with respect to the AR marker 31. Thus, the operation-marker detecting unit 15 can perform an operation in the same manner as in the case where the relative position between the AR marker 31 and the operation marker 32 is previously defined.

According to the above-described first modified example, the operation marker 32 does not need to be provided at a predetermined position with respect to the AR marker 31. Therefore, with the terminal device 10 according to the first modified example, for example, it is possible to achieve a higher flexibility for the position where the operation marker 32 is attached, e.g., the AR marker 31 and the operation marker 32 are attached to different side surfaces of a solid.

Figure 11:
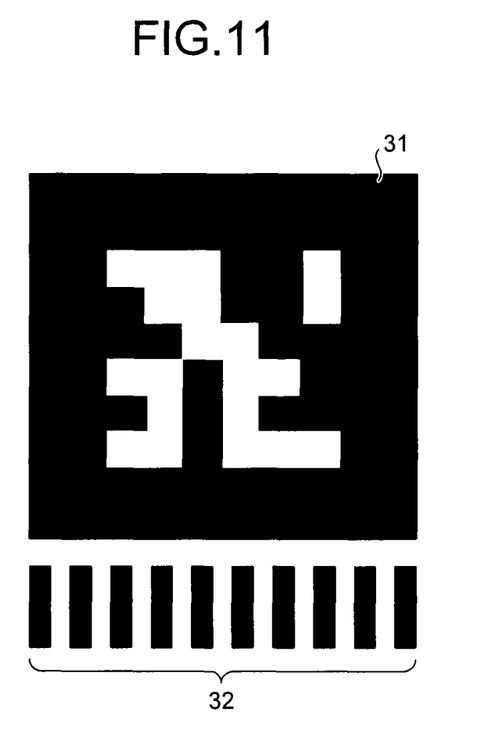
FIG. 11 is a diagram that illustrates an example of the operation marker according to a second modified example.

FIG. 11 is a diagram that illustrates an example of the operation marker 32 according to a second modified example. In the second modified example, the operation-marker detecting unit 15 detects a user's temporal movement with respect to the operation marker 32 in accordance with a user's operation on each of the areas of the operation marker 32 in a plurality of captured images. Then, the virtual-object control unit 17 deforms a virtual object in accordance with the user's temporal movement.

The operation marker 32 according to the second modified example includes, for example, multiple small areas that are arranged in a predetermined direction. For example, each of the small areas has such a size that it is covered by a user's finger, or the like. However, the whole of the small areas has such a size that it is not entirely covered by a user's finger.

The operation-marker detecting unit 15 detects the covered area from the small areas and, if the covered area moves from left to right in the successive captured images, determines that the user's finger moves on the operation marker 32 from left to right. Furthermore, if the covered area moves from right to left in the successive captured images, the operation-marker detecting unit 15 determines that the user's finger moves on the operation marker 32 from right to left.

Then, if the virtual-object control unit 17 determines that the user's finger moves on the operation marker 32 from left to right, it deforms, for example, the page of a book that is a virtual object such that it is turned over from left to right. Furthermore, if the virtual-object control unit 17 determines that the user's finger moves on the operation marker 32 from right to left, it deforms, for example, the page of a book that is a virtual object such that it is turned over from right to left. Moreover, in this case, the virtual-object control unit 17 may move the virtual object such that the animation that has the contents in accordance with the user's temporal movement is displayed.

With the terminal device 10 according to the above-described second modified example, a user's movement can be detected as a user's operation, and the movement of a virtual object can be changed in accordance with the user's movement.

Figure 12:
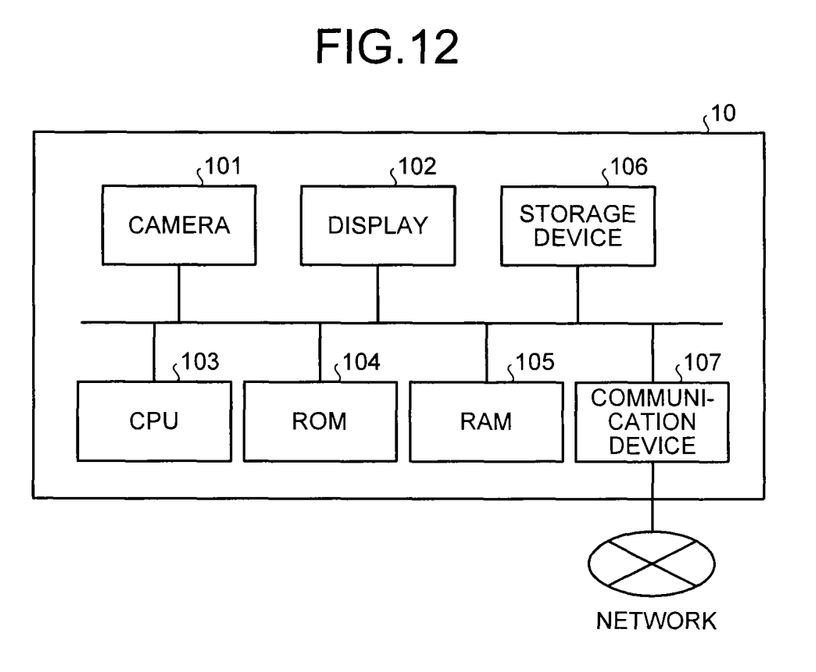
FIG. 12 is a diagram that illustrates the hardware configuration of the terminal device according to the embodiment.

FIG. 12 is a hardware block diagram of the terminal device 10 according to the embodiment. The terminal device 10 includes a camera 101, a display 102, a Central Processing Unit (CPU) 103, a Read Only Memory (ROM) 104, a Random Access Memory (RAM) 105, a storage device 106, and a communication device 107. The units are connected to each other via a bus.

The camera 101 includes an optical system, such as a lens, an image capturing element, a signal processing circuit, and it captures an image of an object and outputs the image data. The camera 101 is the hardware that corresponds to the image capturing unit 11.

The display 102 is a display device, such as a Liquid Crystal Display (LCD). The display 102 displays information on the basis of display signals from the CPU 103. The display 102 is the hardware that corresponds to the display unit 19.

The CPU 103 uses a predetermined area of the RAM 105 as a work area to perform various operations in cooperation with various programs that are previously stored in the ROM 104 or the storage device 106 and control an operation of each of the units included in the terminal device 10 in an integrated manner. Furthermore, the CPU 103 controls the camera 101, the display 102, the communication device 107, or the like, in cooperation with the programs that are previously stored in the ROM 104 or the storage device 106.

The ROM 104 is a nonvolatile memory, and it stores the programs that are used for controlling the terminal device 10 and various types of information. The RAM 105 is a volatile memory, and it serves as a work area for the CPU 103.

The storage device 106 is a rewritable storage, such as a storage medium that uses a semiconductor, e.g., a flash memory, or a storage medium that is magnetically or optically recordable. The storage device 106 stores the programs that are used for controlling the terminal device 10, various types of information, and/or the like. The communication device 107 communicates with an external device, and it is used for input and output of various types of information, and/or the like.

A program to be executed by the terminal device 10 according to the present embodiment is provided by being stored, in the form of a file that is installable and executable, in a recording medium readable by a computer, such as a CD-ROM, a flexible disk (FD), a CD-R, or a Digital Versatile Disk (DVD).

Furthermore, a configuration may be such that the program to be executed by the terminal device 10 according to the present embodiment is stored in a computer connected via a network such as the Internet and provided by being downloaded via the network. Moreover, a configuration may be such that the program to be executed by the terminal device 10 according to the present embodiment is provided or distributed via a network such as the Internet. Moreover, a configuration may be such that the program to be executed by the terminal device 10 according to the present embodiment is provided by being previously installed in a ROM, or the like.

The program to be executed by the terminal device 10 according to the present embodiment has a modular configuration that includes the above-described operation units (the AR-marker detecting unit 13, the operation-marker detecting unit 15, the operation detecting unit 16, the virtual-object control unit 17, and the drawing unit 18) of the terminal device 10, and the CPU 103 (processor) reads the program from the storage medium and executes it so as to load the above-described units into a main storage device so that each of the units (the AR-marker detecting unit 13, the operation-marker detecting unit 15, the operation detecting unit 16, the virtual-object control unit 17, and the drawing unit 18) of the terminal device 10 is generated in the main storage device. Furthermore, all or part of the terminal device 10 may be configured by using hardware.

According to an embodiment, it is possible to easily realize an interaction in accordance with a user's operation when the AR technology is implemented by using images that are captured by a camera.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
circuitry configured to
detect, from a captured image, an augmented reality marker indicating that a virtual object is to be displayed,
detect, from the captured image, an area of an operation marker that is provided so as to correspond to the augmented reality marker, and determine that an operation of a user is performed when the operation marker is touched by a part of a body of the user for a predetermined period even when the part of the body is separated from the operation marker, deform a virtual object corresponding to the augmented reality marker based on the operation of the user, and draw the deformed virtual object in the captured image in a superimposed manner.

2. The image processing device according to claim 1, wherein the operation marker is located at a predetermined position with respect to the augmented reality marker, and the circuitry is configured to detect the area of the operation marker in the captured image based on a position of the area of the augmented reality marker.

3. The image processing device according to claim 1, wherein the operation marker is detectable independently from the augmented reality marker, and the circuitry is configured to detect, from the captured image, the area of the operation marker independently from the augmented reality marker.

4. The image processing device according to claim 1, wherein the circuitry is configured to detect a difference between a partial image of the area of the operation marker in the captured image and a reference image of the operation marker that is previously stored and, when the difference is greater than a predetermined threshold, determine that the operation is performed on the corresponding operation marker.

5. The image processing device according to claim 1, further comprising a display configured to display the captured image where the virtual object is superimposed by the circuitry.

6. An image processing method comprising:

detecting, from a captured image, an augmented reality marker indicating that a virtual object is to be displayed;

detecting, from the captured image, an area of an operation marker that is provided so as to correspond to the augmented reality marker;

determining that an operation of a user is performed when the operation marker is touched by a part of a body of the user for a predetermined period even when the part of the body is separated from the operation marker;

deforming a virtual object corresponding to the augmented reality marker based on the operation of the user; and drawing the deformed virtual object in the captured image in a superimposed manner.

7. A computer program product comprising a non-transitory computer-readable medium having computer readable program codes, the program codes when executed causing the computer to perform:

detecting, from a captured image, an augmented reality marker indicating that a virtual object is to be displayed;

detecting, from the captured image, an area of an operation marker that is provided so as to correspond to the augmented reality marker;

determining that an operation of a user is performed when the operation marker is touched by a part of a body of the user for a predetermined period even when the part of the body is separated from the operation marker;

deforming a virtual object corresponding to the augmented reality marker in based on the operation of the user; and drawing the deformed virtual object in the captured image in a superimposed manner.

8. An image processing device comprising:

circuitry configured to detect, from a captured image, an augmented reality marker indicating that a virtual object is to be displayed, detect, from the captured image, an area of at least one operation marker that is provided so as to correspond to the augmented reality marker, and detect, as an operation of a user, a movement of a part of a body of the user with respect to the at least one operation marker, change a movement of the virtual object in accordance with the movement of the part of the body of the user, and draw the changed virtual object in the captured image in a superimposed manner.

9. The image processing device according to claim 8, wherein the circuitry is configured to detect the operation of the user when the part of the body of the user moves on the at least one operation marker.

10. An image processing method comprising:

detecting, from a captured image, an augmented reality marker indicating that a virtual object is to be displayed;

detecting, from the captured image, an area of at least one operation marker that is provided so as to correspond to the augmented reality marker;

detecting, as an operation of a user, a movement of a part of a body of the user with respect to the at least one operation marker;

changing a movement of the virtual object in accordance with the movement of the part of the body of the user; and drawing the changed virtual object in the captured image in a superimposed manner.

11. A computer program product comprising a non-transitory computer-readable medium having computer readable program codes, the program codes when executed causing the computer to perform:

detecting, from a captured image, an augmented reality marker indicating that a virtual object is to he displayed;

detecting, from the captured image, an area of at least one operation marker that is provided so as to correspond to the augmented reality marker;

detecting, as an operation of a user, a movement of a part of a body of the user with respect to the at least one operation marker;

changing a movement of the virtual object in accordance with the movement of the part of the body of the user; and drawing the changed virtual object in the captured image in a superimposed manner.

* * * * *